United States Patent
Mittal et al.

(10) Patent No.: US 12,557,035 B2
(45) Date of Patent: Feb. 17, 2026

(54) MITIGATION OF FLUCTUATIONS IN TRANSMIT POWER IN AN ACCESS POINT

(71) Applicant: Arista Networks, Inc., Santa Clara, CA (US)

(72) Inventors: Parag Mittal, Pune (IN); Rachit Srivastava, Pune (IN); Venkata Ramchandra Murthy Jonnalagadda, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 346 days.

(21) Appl. No.: 18/486,920

(22) Filed: Oct. 13, 2023

(65) Prior Publication Data

US 2025/0126573 A1 Apr. 17, 2025

(51) Int. Cl.
*H04W 52/24* (2009.01)
*H04W 52/14* (2009.01)
*H04W 52/36* (2009.01)

(52) U.S. Cl.
CPC ....... *H04W 52/245* (2013.01); *H04W 52/143* (2013.01); *H04W 52/362* (2013.01)

(58) Field of Classification Search
CPC ... H04W 52/24; H04W 52/245; H04W 52/14; H04W 52/143; H04W 52/36; H04W 52/362; H04L 1/0026; H04L 1/0029
See application file for complete search history.

(56) References Cited

U.S. PATENT DOCUMENTS

| | | | | |
|---|---|---|---|---|
| 7,068,658 B2 * | 6/2006 | Rezaiifar | ............. | H04L 1/165 370/394 |
| 7,072,680 B2 * | 7/2006 | Lee | .............. | H04W 52/248 370/320 |
| 10,791,524 B2 * | 9/2020 | Desai | ............. | H04W 52/343 |
| 11,632,723 B2 * | 4/2023 | Desai | ............. | H04W 52/242 370/329 |
| 12,069,588 B2 * | 8/2024 | Desai | ............. | H04W 52/242 |
| 12,192,053 B2 * | 1/2025 | Desai | ............. | H04L 41/149 |
| 2005/0032540 A1 * | 2/2005 | Lee | .............. | H04W 52/12 455/69 |
| 2024/0364589 A1 * | 10/2024 | Desai | ............. | H04L 41/0836 |
| 2024/0364610 A1 * | 10/2024 | Desai | ............. | H04L 43/0876 |
| 2024/0365214 A1 * | 10/2024 | Desai | ............. | H04B 17/318 |
| 2024/0373234 A1 * | 11/2024 | Desai | ............. | H04L 41/0883 |
| 2024/0373247 A1 * | 11/2024 | Desai | ............. | H04B 17/328 |
| 2024/0373261 A1 * | 11/2024 | Desai | ............. | H04W 24/08 |
| 2024/0373367 A1 * | 11/2024 | Desai | ............. | H04W 52/241 |
| 2024/0373491 A1 * | 11/2024 | Choi, II | ............. | H04W 24/02 |
| 2024/0414053 A1 * | 12/2024 | Desai | ............. | H04L 41/0836 |
| 2025/0119849 A1 * | 4/2025 | Salim | ............. | H04W 52/243 |
| 2025/0317942 A1 * | 10/2025 | Lyu | ............. | H04W 72/044 |

* cited by examiner

Primary Examiner — Hai V Nguyen
(74) Attorney, Agent, or Firm — Fountainhead Law Group, PC

(57) ABSTRACT

Transmit power determination in a wireless access point (target AP) includes regularly updating receive signal strength indicators (RSSIs) associated with APs and clients in the neighborhood of the target AP. The transmit power of the target AP is recalibrated (adjusted) with each update. Recalibration continues so long as adjustments to the transmit power continue in the same direction (either increasing or decreasing) with each update. When an adjustment reversal occurs, recalibration terminates. In a variation, a final update on the transmit power, in the reversed direction, can be made prior to terminating the recalibration.

20 Claims, 3 Drawing Sheets

MITIGATION OF FLUCTUATIONS IN TRANSMIT POWER IN AN ACCESS POINT

BACKGROUND

The present disclosure relates to wireless access points (APs). Typically, access points are deployed to use Auto Transmit Power Control (TPC) so that customers (users that connect to the AP) need not manually input the transmit power levels of the radios. Many Auto TPC algorithms are based on the received signal strength indicator (RSSI) of neighboring devices (APs or clients) or RSSI of the given AP radio as seen by neighboring devices.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure is directed to transmit power control (TPC) in a wireless AP. More specifically, the present disclosure provides an algorithm to reduce fluctuations in the transmit power of an AP. Prior art techniques typically include adjusting transmit power in response to changes in the RSSIs of nearby devices. However, RSSIs can exhibit spurious and frequent fluctuations, resulting in undesirable corresponding fluctuations in transmit power. Fluctuations in the transmit power of the AP can result in undesirable changes in coverage of the AP, and can even cause clients to frequently roam to nearby APs or to disconnect from the AP altogether.

Transmit power adjustment in accordance with the present disclosure sets an initial transmit power level for the AP. The algorithm then maintains that transmit power level if there is no change in the configuration of the AP and there is no change in the neighborhood of the AP. The "neighborhood" of the AP refers to devices (e.g., other APs) whose RSSI's are considered by the AP or devices (e.g., other APs and clients) that consider the AP's RSSI.

Each time a change in RSSI is detected, the transmit power is adjusted, until an inversion in the adjustment direction occurs. At the time of a reversal of the adjustment direction, the algorithm can either (1) stop running or (2) can make a final adjustment in the reverse direction and then stop running. By stopping the algorithm, any subsequent fluctuations in RSSI are ignored and transmit power remains constant.

The algorithm can resume in response to a user-initiated configuration change in the transmit power or RSSI configuration, or when a device (client or AP) is added to or removed from the neighborhood.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
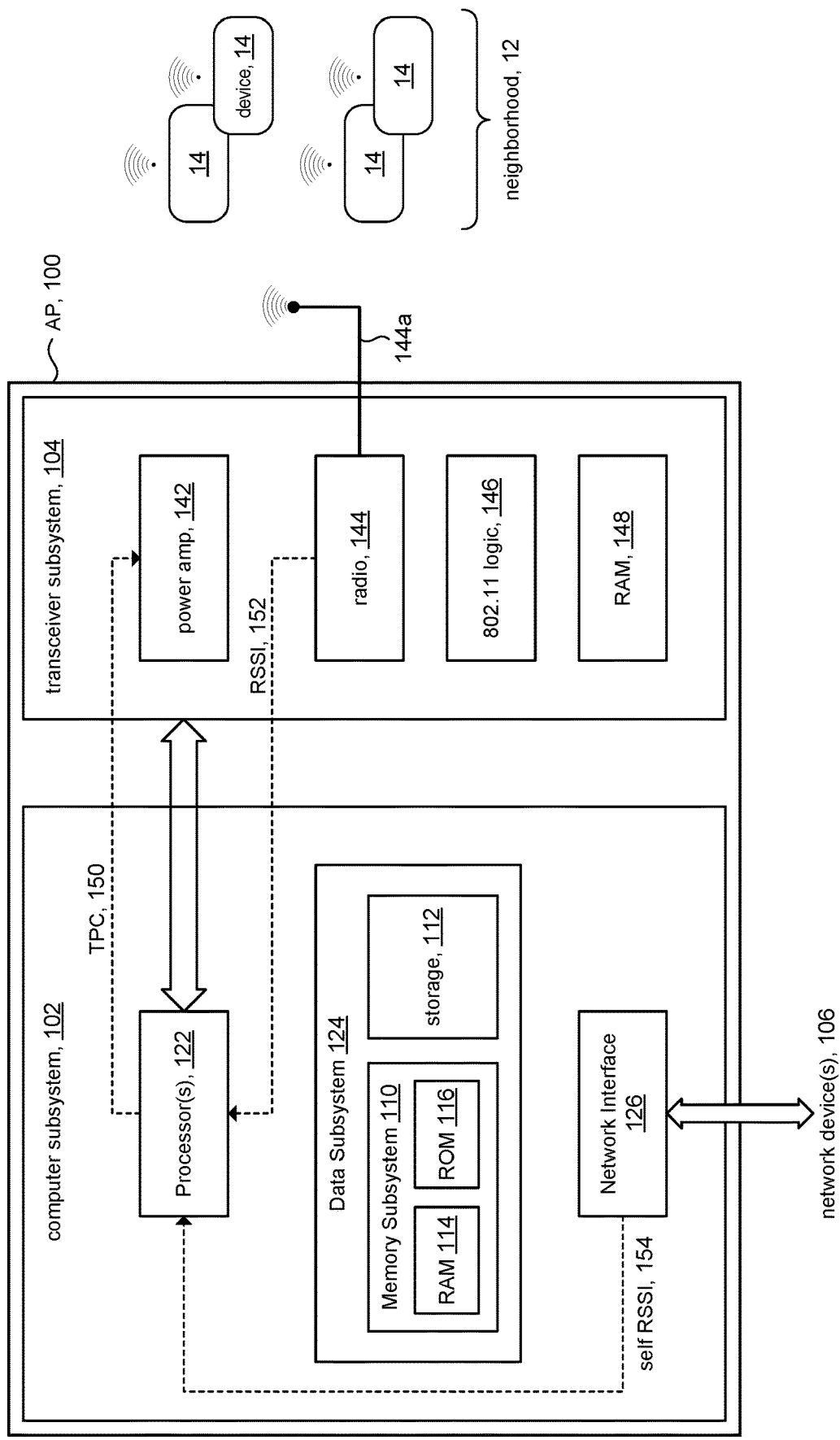
FIG. 1 is a high-level block diagram of an access point in accordance with the present disclosure.

FIG. 1 depicts a schematic block diagram of an AP 100 in accordance with some embodiments. AP 100 can comprise computer subsystem 102, transceiver 104, and antenna 144a. Computer subsystem 102 can include one or more processors 122, a data subsystem 124, and a network interface 126.

Processor(s) 122 can be in communication with transceiver subsystem 104 to configure the transceiver 104 and otherwise control operations of the transceiver. Data subsystem 124 can include memory subsystem 110 and storage subsystem 112. Memory subsystem 110 can include memory components such as random access memory (RAM) 114 for storage of instructions and data during program execution, and read-only memory (ROM) 116 in which fixed instructions are stored. Storage subsystem 112 can provide persistent (i.e., non-volatile) storage for program and data files. Storage subsystem 112 can represent non-transitory computer-readable storage media to store program code and/or data, which when executed by computer subsystem 102, can cause the processors 122 to perform operations in accordance with embodiments of the present disclosure. Network interface subsystem 126 can serve as an interface for communicating data between AP 100 and other computer systems or networks, for example, network device 106 (FIG. 1).

Transceiver subsystem 104 can include a power amplifier 142, a radio component 144, IEEE 802.11 logic 146, and RAM 148. Power amplifier 142 can provide power to radio 144, for example, in order to transmit and receive signals via antenna 144a. IEEE 802.11 logic 146 can comprise data processing elements such as an ASIC (application specific integrated circuit), FPGA (field programmable array), digital processing unit, and the like. Logic 146 can be configured to process signals (received or for transmission) in accordance with the Institute of Electrical and Electronics Engineers (IEEE) 802.11 standards. RAM 148 can provide buffers and other data structures to support the transmission and reception of data.

It is noted that AP 100 is illustrative. It will be appreciated that other embodiments of an AP in accordance with the present disclosure can include more or fewer components than are shown in FIG. 1.

Processor 122 can be programmed to provide transmit power control (TPC) 150 to power amp 142 to control the transmit power of transceiver 104 in accordance with the present disclosure. Processor 122 can compute or otherwise generate control signal TPC 150, based on RSSI data 152 associated with devices (other APs, clients) 14 in communication with AP 100. RSSI represents the power present in a received radio signal transmitted by a device. In some embodiments, radio 144 can compute the RSSI associated with each device 14 in neighborhood 12. Devices whose RSSI's are used to generate TPC 150 can be collectively referred to as the neighborhood 12 of AP 100. In some embodiments, TPC 150 can be further based on a self RSSI 154 that represents the RSSI of AP 100 as seen by devices 14. Neighborhood 12 also includes devices that consider the self RSSI 154 of AP 100. In some embodiments, the self RSSI may be communicated to the AP by devices 14 via a suitable out-of-band communication channel (wired or wireless).

Figure 2:
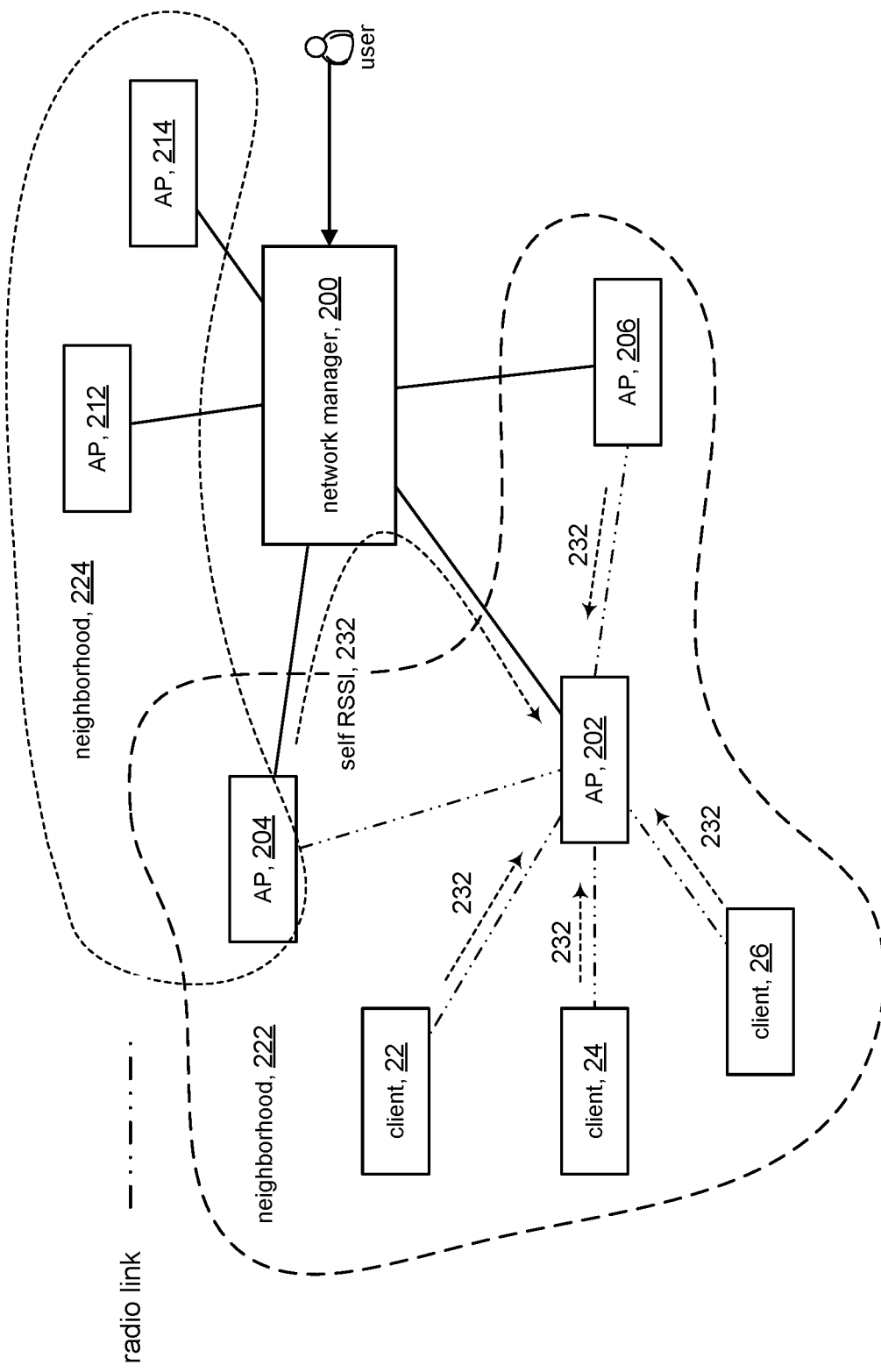
FIG. 2 illustrates a deployment of APs and clients in accordance with some embodiments.

FIG. 2 illustrates an example of a deployment (e.g., in an organization) of wireless APs 202, 204, 206, 212, 214. The APs can be connected (e.g., a wired connection) to a network manager 200. The network manager 200 can configure, monitor, and otherwise manage the APs. Although not shown, it will be understood that the APs are connected to a communication network to provide communication between users in the deployment and to provide access outside of the deployment, such as other networks in the organization, the Internet, etc.

FIG. 2 illustrates an example of a neighborhood as used in accordance with the present disclosure. A neighborhood comprises neighbor (neighborhood) devices whose RSSIs are considered by an AP configured to control transmit power in accordance with the present disclosure. In accordance with the present disclosure, a neighborhood also includes neighbor devices that consider the RSSI of the AP itself, referred to herein as the "self RSSI."

Consider for discussion purposes AP 202. Suppose AP 202 is configured to control its transmit power in accordance with the present disclosure. FIG. 2 illustrates an example of a neighborhood 222 of AP 202 comprising neighbor devices APs 202-206 and clients 22, 24, 26 (e.g., computers, mobile devices, etc. associated with an AP) whose RSSIs are considered by AP 202 and who consider the RSSI (self RSSI) of AP 202. The figure further illustrates different ways that neighbor devices can provide the self RSSI 232 to AP 202. Neighbor clients 22-26, for example, can provide their detected RSSI of AP 202 to AP 202 via their respective radio links to the AP. A neighbor AP can likewise provide its detected RSSI of AP 202 to AP 202 via a radio link with AP 202 (e.g., between AP 202 and AP 206), via a wired connection through the network manager (e.g., from AP 204 to network manager 200 to AP 202), or via a direct (wired) connection to AP 202 (not shown).

An AP can be a neighbor device in multiple neighborhoods. FIG. 2, for example, shows that AP 204 is a neighbor device in the neighborhood 222 of AP 202, and is a neighbor device in another neighborhood 224.

Figure 3:
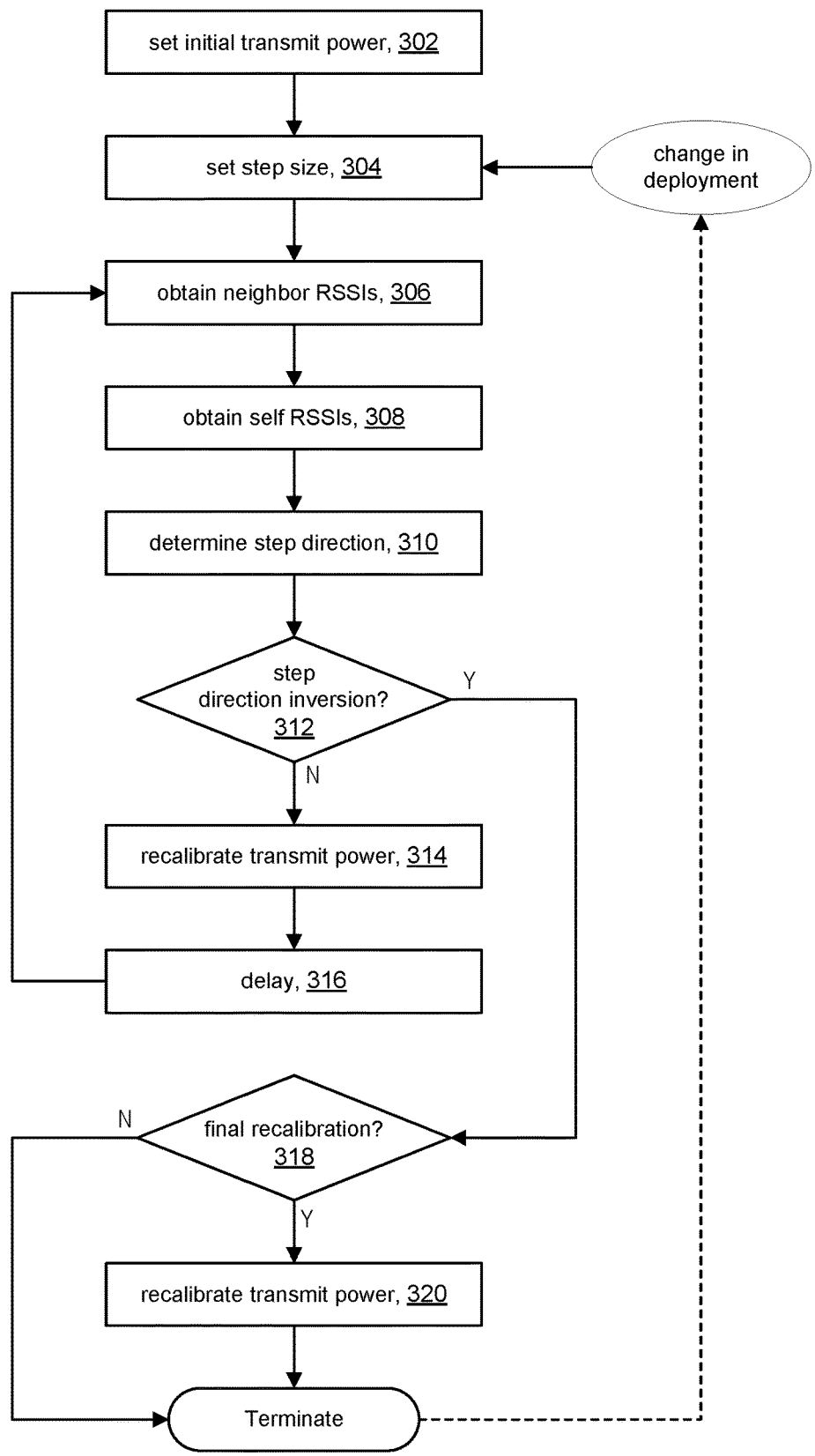
FIG. 3 illustrates a flow of operations in accordance with some embodiments.

Referring to FIG. 3, the discussion will now turn to a high-level description of processing in an access point (e.g., AP 100, FIG. 1) for controlling its transmit power in accordance with the present disclosure. In some embodiments, the AP can include one or more processing units (circuits), which when operated, can cause the AP to perform processing in accordance with FIG. 3. Processing units (circuits), for example, can include general central processing units (CPUs) that operate by way of executing computer program code stored on a non-volatile computer readable storage medium (e.g., read-only memory); e.g., processor 122 (FIG. 1) can be a general CPU. The operation and processing blocks described below are not necessarily executed in the order shown. Operations can be combined or broken out into smaller operations in various embodiments. Operations can be allocated for execution among one or more concurrently executing processes and/or threads.

At operation 302, the AP can set an initial transmit power level. The initial transmit power level can be set by the user, by way of a configuration file, and so on. The initial transmit power can be set to any suitable value. In some embodiments, for example, the initial transmit power can be the average, on a log scale, of the transmit power range of the AP. For example, a typical range of transmit power can vary from 0 dBm to 36 dBm, in which case the initial transmit power can be 18 dBm. It will be appreciated, however, that the initial transmit power level can be based on any suitable criteria. The initial transmit power level sets an initial value for the current transmit power level.

At operation 304, the AP can set a step size in accordance with the present disclosure. As discussed in more detail below, the step size can be used to recalibrate the transmit power level. The step size can be set by the user, by way of a configuration file, and so on. The step size can be set to any suitable value. In some embodiments, for example, the step size can be a percentage of the transmit power range of the AP. For example, a typical range of transmit power can vary from 0 dBm to 36 dBm and the step size can be set at 3 dBm (approximately 10% of the range on a log scale). In some embodiments, for example, the step size can be heuristically determined, the step size can be determined based on trial and error, and so on.

At operation 306, the AP can obtain neighbor RSSIs from neighbor devices in the neighborhood of the AP. Referring, for example, to neighborhood 222 in the deployment shown in FIG. 2, the neighbor devices of AP 202 include APs 204, 206 and clients 22-26. RSSI is an indication of the power level of a signal received by the radio of the AP. Computing RSSI is known and is defined in the Institute of Electrical and Electronics Engineers (IEEE) standard 802.11. The transceiver subsystem (e.g. 104, FIG. 1) of the AP can compute, obtain, or otherwise determine an RSSI value for each neighbor (AP or client) in its neighborhood.

At operation 308, the AP can obtain self RSSIs from neighbor devices in the neighborhood of the AP. Self RSSI refers to an RSSI value of the AP as seen by a neighbor device. Referring to the neighborhood 222 in FIG. 2, for example, neighbor device AP 204 will have an RSSI value for AP 202 determined from the signal strength of the radio signal transmitted by AP 202 and detected by AP 204. Likewise, neighbor device client 22 will have an RSSI value for AP 202 determined from the signal strength of the radio signal transmitted by AP 202 and detected by client 22, and so on. The self RSSIs in the neighbor devices may vary from one device to another depending on the strength of the radio signal they receive from AP 202. As illustrated in the example in FIG. 2, the AP can obtain the self RSSIs from its neighbors either over the air (via radio signals), such as with clients 22-26 and AP 206, or over a wired connection, such as with AP 204.

At operation 310, the AP can determine a step direction. The step direction specifies whether to increase the transmit power of the AP's radio or to reduce the transmit power of the AP's radio. In accordance with the present disclosure, the step direction can be based on the RSSI data obtained at operations 306 and 308. In some embodiments, for example, an average of the RSSI can be computed from the RSSI data obtained at operations 306 and 308. If the RSSI average exceeds a predetermined (user configured) RSSI threshold value, then the signal strength can be deemed to be acceptable and a reduction in transmit power may be appropriate; in other words, the step direction can be DOWN. Conversely, if the average falls below the predetermined RSSI threshold value, then the signal strength can be deemed weak and an increase in transmit power may be appropriate to increase the signal strength; in other words, the step direction can be UP. It will be appreciated that, in general, the UP/DOWN determination of the step direction can be based on any function of the neighbor RSSIs and the self RSSIs.

At decision point 312, processing can proceed to operation 314 or 318, depending on whether a step direction inversion occurred or not. As can be seen in FIG. 3, operations 306 to 316 constitute a recalibration loop. With each pass through the loop, the RSSI data is updated, the step direction is updated based on the updated RSSI data, and the transmit power is recalibrated. The loop continues so long as the updated step direction does not change from the initial step direction determined from the first time through the loop. The loop terminates when the updated step direction in the current pass changes from the initial step direction. Accordingly, if the updated step direction in the current pass through loop does not change (step direction inversion did not occur), then processing can proceed to operation 314. If the updated step direction in the current pass through loop changes (step direction inversion did occur), then processing can proceed to decision point 318.

Step Direction Inversion Did not Occur

At operation 314, in response to a determination at decision point 312 that a step direction inversion did not occur, the AP can recalibrate the transmit power of its radio. In some embodiments, for example, the AP can adjust the current transmit power by the step size (set at operation 304) according to the step direction. For example, if the step direction is DOWN, then the current transmit power level can be reduced by an amount proportional to the step size. Conversely, if the step direction is UP, then the current transmit power level can be increased by an amount proportional to the step size. In some embodiments, for example, the transmit power is incremented (or decremented) by an amount equal to the step size.

At operation 316, the AP can delay for a predetermined (user configured) sleep period. The sleep period can be set by the user, by way of a configuration file, and so on. Upon expiration of the sleep period, the AP can loop back to operation 306 to perform another round of processing.

Step Direction Inversion Did Occur

At decision point 318, in response to a determination at decision point 312 that a step direction inversion occurred, the AP can terminate the processing loop. Alternatively, in some embodiments, the AP can perform a final recalibration (operation 320) before terminating the processing loop.

At operation 320, the AP can perform a final recalibration of the transmit power, but in the reverse direction. For example, if the initial step direction was the UP direction, then the final recalibration would be in the DOWN direction. Conversely, if the initial step direction was the DOWN direction, then the final recalibration would be in the UP direction. In some embodiments, the step size can be applied to the transmit power for the final recalibration to back-off the last recalibration operation prior to the step direction reversal. In other embodiments, the final recalibration can apply a percentage of the step size to the transmit power. Processing of the loop can terminate.

The following example illustrates the operations of FIG. 3:

initial transmit power: 18 dBm (operation 302)
step size: 3 dbm (operation 304)
time to (initial pass through the loop, operations 306-316)
  RSSI data is obtained and the initial step direction is determined to be UP
  transmit power is recalibrated to 21 dBm (NO at decision point 312)
time t1 (subsequent pass through the loop)
  RSSI data is updated and the updated step direction is determined to be UP
  transmit power is increased to 24 dBm (NO at decision point 312)
time t2 (another pass through the loop)
  RSSI data is updated and the updated step direction is determined to be UP
  transmit power is increased to 27 dBm (NO at decision point 312).
time t3 (another pass through the loop)
  RSSI data is updated and the updated step direction is determined to be DOWN
  step direction inversion occurs (YES at decision point 312)
  no final recalibration (NO at decision point 318)—transmit power is at 27 dBm
  OR, final recalibration (operation 320)—transmit power is set to 24-27 dBm, depending on how much of the step size is used for the final recalibration which, as noted above, can anywhere from the full value (100%) of the step size to 0% of the step size (no back-off)

By terminating the recalibration loop in response to a step direction reversal (e.g. at time t3), the present disclosure can avoid fluctuations in transmit power that may occur if the RSSI fluctuates subsequent to time t3. A final recalibration (e.g., operation 320) can serve to back-off the last recalibration operation prior to the step direction reversal. The back-off can be useful in case of overshoot (or undershoot). For example, without the final recalibration the final setting of the transmit power is 27 dBm, which may be deemed too high (overshoot). A final recalibration can be used to back-off the transmit power to a level lower than 27 dBm. As explained above, the back-off (i.e., final recalibration) can be the step size, in which case the transmit power is backed off to 24 dBm. Alternatively, the back-off can be a percentage of the step size (e.g., 33%), in which case the final transmit power is set to 26 dBm.

FIG. 3 shows, in accordance with the present disclosure, that the recalibration loop can resume in response to a change in the deployment subsequent to terminating the loop. For example, if a neighbor device leaves or is removed from the neighborhood, or joins or is added to the neighborhood, the recalibration loop can resume. If the user changes a configuration in the AP that relates to the transmit power, the recalibration loop can resume; for example, the user may change the range of transmit power by setting the minimum power and/or the maximum power. The recalibration loop can resume in response to a user adjusting the RSSI threshold used in decision point 312, and so on.

FURTHER EXAMPLES

Features described above as well as those claimed below may be combined in various ways without departing from the scope hereof. The following examples illustrate some possible, non-limiting combinations:

(A1) A method performed in a wireless access point (AP) device for controlling transmit power of the AP device, the method comprising: (a) setting an initial power level for the transmit power; (b) obtaining a plurality of received signal strength indicator (RSSI) data associated with a plurality of neighborhood devices; (c) determining an initial power-level step direction based on the plurality of RSSI data; (d) adjusting the transmit power by a step amount in accordance with the power-level step direction; (e) obtaining a plurality of subsequent RSSI data of the neighborhood devices; (f) updating the power-level step direction based on the plurality of subsequent RSSI data; (g) repeating (d) to (g) when the updated power-level step direction has not changed from the initial power-level step direction; and (h) terminating adjustment of the transmit power when the power-level step direction has changed from the initial power-level step direction.

(A2) For the method denoted as (A1), terminating adjustment of the transmit power includes making a single additional adjustment of the transmit power by a percentage of the step amount, in the range of 0% to 100%, in accordance with the changed power-level step direction.

(A3) The method denoted as any of (A1) through (A2), further comprising resuming with (b) in response to detecting a user-initiated configuration associated with the transmit power.

(A4) For the method denoted as any of (A1) through (A3), the user-initiated configuration is a configuration of the transmit power.

(A5) For the method denoted as any of (A1) through (A4), the power-level step direction is based on comparing the plurality of RSSI data with an RSSI threshold, wherein the user-initiated configuration is a configuration of the RSSI threshold.

(A6) The method denoted as any of (A1) through (A5), further comprising resuming with (b) in response to detecting addition or removal of a device from the plurality of neighborhood devices subsequent to terminating adjustment of the transmit power.

(A7) For the method denoted as any of (A1) through (A6), the plurality of RSSI data and the plurality of subsequent RSSI data include RSSI data of the wireless AP device as seen by the neighborhood devices.

(A8) For the method denoted as any of (A1) through (A7), the neighborhood devices include AP devices and/or client devices.

(B1) A network device comprising: one or more computer processors; and a computer-readable storage device comprising instructions for controlling the one or more computer processors to: set an initial power level for a transmit power of the network device; and repeatedly adjust the transmit power of the network device by: obtaining a plurality of received signal strength indicator (RSSI) data associated with a plurality of neighborhood devices; determining a power-level step direction based on the plurality of RSSI data; and adjusting the transmit power by a step amount in accordance with the power-level step direction, wherein the transmit power of the network device is repeatedly adjusted as long as the power-level step direction remains unchanged from the initial power-level step direction, wherein adjusting the transmit power of the network device terminates when the power-level step direction has changed from a previous power-level step direction.

(B2) For the network device denoted as (B1), subsequent to terminating adjustment of the transmit power, the network device makes a single additional adjustment of the transmit power by a percentage of the step amount, in the range of 0% to 100%, in accordance with the changed power-level step direction.

(B3) For the network device denoted as any of (B1) through (B2), the computer-readable storage device further comprises instructions for controlling the one or more computer processors to resume, subsequent to terminating adjustment of the transmit power of the network device, with repeatedly adjusting the transmit power in response to detecting a user-initiated configuration associated with the transmit power.

(B4) For the network device denoted as any of (B1) through (B3), the user-initiated configuration is a configuration of the transmit power.

(B5) For the network device denoted as any of (B1) through (B4), the power-level step direction is based on comparing the plurality of RSSI data with an RSSI threshold, wherein the user-initiated configuration is a configuration of the RSSI threshold.

(B6) For the network device denoted as any of (B1) through (B5), the computer-readable storage device further comprises instructions for controlling the one or more computer processors to resume, subsequent to terminating adjustment of the transmit power of the network device, with repeatedly adjusting the transmit power in response to detecting addition or removal of a device from the plurality of neighborhood devices.

(B7) For the network device denoted as any of (B1) through (B6), the plurality of RSSI data and the plurality of subsequent RSSI data include RSSI data of the wireless AP as seen by the neighborhood devices.

(C1) A non-transitory computer-readable storage device having stored thereon computer executable instructions, which when executed, cause the network device to: set an initial power level for a transmit power of the network device; and repeatedly adjust the transmit power of the network device by: obtaining a plurality of received signal strength indicator (RSSI) data associated with a plurality of neighborhood devices; determining a power-level step direction based on the plurality of RSSI data; adjusting the transmit power by a step amount in accordance with the power-level step direction; and terminating adjusting the transmit power when the power-level step direction changes from the initial power-level step direction.

(C2) For the non-transitory computer-readable storage device denoted as (C1), subsequent to terminating adjustment of the transmit power, the network device makes a single additional adjustment of the transmit power by a percentage of the step amount, in the range of 0% to 100%, in accordance with the changed power-level step direction.

(C3) For the non-transitory computer-readable storage device denoted as any of (C1) through (C2), the computer executable instructions, which when executed, further cause the network device to resume with repeatedly adjusting the transmit power in response to detecting a user-initiated configuration associated with the transmit power.

(C4) For the non-transitory computer-readable storage device denoted as any of (C1) through (C3), the computer executable instructions, which when executed, further cause the network device to resume with repeatedly adjusting the transmit power in response to detecting addition or removal of a device from the plurality of neighborhood devices.

(C5) For the non-transitory computer-readable storage device denoted as any of (C1) through (C4), the plurality of RSSI data and the plurality of subsequent RSSI data include RSSI data of the wireless AP as seen by the neighborhood devices.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed in a wireless access point (AP) device for controlling transmit power of the AP device, the method comprising:
   (a) setting an initial power level for the transmit power;
   (b) obtaining a plurality of received signal strength indicator (RSSI) data associated with a plurality of neighborhood devices;
   (c) determining an initial power-level step direction based on the plurality of RSSI data;
   (d) adjusting the transmit power by a step amount in accordance with the power-level step direction;
   (e) obtaining a plurality of subsequent RSSI data of the neighborhood devices;
   (f) updating the power-level step direction based on the plurality of subsequent RSSI data;
   (g) repeating (d) to (g) when the updated power-level step direction has not changed from the initial power-level step direction; and
   (h) terminating adjustment of the transmit power when the power-level step direction has changed from the initial power-level step direction.

2. The method of claim 1, wherein terminating adjustment of the transmit power includes making a single additional adjustment of the transmit power by a percentage of the step amount, in the range of 0% to 100%, in accordance with the changed power-level step direction.

3. The method of claim 1, further comprising resuming with (b) in response to detecting a user-initiated configuration associated with the transmit power.

4. The method of claim 3, wherein the user-initiated configuration is a configuration of the transmit power.

5. The method of claim 3, wherein the power-level step direction is based on comparing the plurality of RSSI data with an RSSI threshold, wherein the user-initiated configuration is a configuration of the RSSI threshold.

6. The method of claim 1, further comprising resuming with (b) in response to detecting addition or removal of a device from the plurality of neighborhood devices subsequent to terminating adjustment of the transmit power.

7. The method of claim 1, wherein the plurality of RSSI data and the plurality of subsequent RSSI data include RSSI data of the wireless AP device as seen by the neighborhood devices.

8. The method of claim 1, wherein the neighborhood devices include AP devices and/or client devices.

9. A network device comprising:
   one or more computer processors; and
   a computer-readable storage device comprising instructions for controlling the one or more computer processors to:
      set an initial power level for a transmit power of the network device; and
      repeatedly adjust the transmit power of the network device by:
         obtaining a plurality of received signal strength indicator (RSSI) data associated with a plurality of neighborhood devices;
         determining a power-level step direction based on the plurality of RSSI data; and
         adjusting the transmit power by a step amount in accordance with the power-level step direction,
      wherein the transmit power of the network device is repeatedly adjusted as long as the power-level step direction remains unchanged from the initial power-level step direction,
   wherein adjusting the transmit power of the network device terminates when the power-level step direction has changed from a previous power-level step direction.

10. The network device of claim 9, wherein subsequent to terminating adjustment of the transmit power, the network device makes a single additional adjustment of the transmit power by a percentage of the step amount, in the range of 0% to 100%, in accordance with the changed power-level step direction.

11. The network device of claim 9, wherein the computer-readable storage device further comprises instructions for controlling the one or more computer processors to resume, subsequent to terminating adjustment of the transmit power of the network device, with repeatedly adjusting the transmit power in response to detecting a user-initiated configuration associated with the transmit power.

12. The network device of claim 11, wherein the user-initiated configuration is a configuration of the transmit power.

13. The network device of claim 11, wherein the power-level step direction is based on comparing the plurality of RSSI data with an RSSI threshold, wherein the user-initiated configuration is a configuration of the RSSI threshold.

14. The network device of claim 9, wherein the computer-readable storage device further comprises instructions for controlling the one or more computer processors to resume, subsequent to terminating adjustment of the transmit power of the network device, with repeatedly adjusting the transmit power in response to detecting addition or removal of a device from the plurality of neighborhood devices.

15. The network device of claim 9, wherein the plurality of RSSI data and the plurality of subsequent RSSI data include RSSI data of the wireless AP as seen by the neighborhood devices.

16. A non-transitory computer-readable storage device in a network device, the non-transitory computer-readable storage device having stored thereon computer executable instructions, which when executed, cause the network device to:
   set an initial power level for a transmit power of the network device; and
   repeatedly adjust the transmit power of the network device by:
      obtaining a plurality of received signal strength indicator (RSSI) data associated with a plurality of neighborhood devices;
      determining a power-level step direction based on the plurality of RSSI data;
      adjusting the transmit power by a step amount in accordance with the power-level step direction; and
      terminating adjusting the transmit power when the power-level step direction changes from the initial power-level step direction.

17. The non-transitory computer-readable storage device of claim 16, wherein subsequent to terminating adjustment of the transmit power, the network device makes a single additional adjustment of the transmit power by a percentage of the step amount, in the range of 0% to 100%, in accordance with the changed power-level step direction.

18. The non-transitory computer-readable storage device of claim 16, wherein the computer executable instructions, which when executed, further cause the network device to resume with repeatedly adjusting the transmit power in response to detecting a user-initiated configuration associated with the transmit power.

19. The non-transitory computer-readable storage device of claim 16, wherein the computer executable instructions, which when executed, further cause the network device to resume with repeatedly adjusting the transmit power in response to detecting addition or removal of a device from the plurality of neighborhood devices.

20. The non-transitory computer-readable storage device of claim 16, wherein the plurality of RSSI data and the plurality of subsequent RSSI data include RSSI data of the wireless AP as seen by the neighborhood devices.

* * * * *